United States Patent

[11] 3,613,908

| [72] | Inventor | Lewis Mulitz<br>Washington, D.C. |
|---|---|---|
| [21] | Appl. No. | 20,636 |
| [22] | Filed | Mar. 18, 1970 |
| [45] | Patented | Oct. 19, 1971 |
| [73] | Assignee | Potomac Iron Works, Inc.<br>Hyattsville, Md. |

[54] VEHICLE PARKING EQUIPMENT
4 Claims, 15 Drawing Figs.

[52] U.S. Cl. .................................................. 214/16.1 A,
                                                                    104/44
[51] Int. Cl. ........................................................ E04h 6/06
[50] Field of Search ............................................ 214/16.11,
                            16.1 A, 16.18 D; 104/35, 44, 46–48

[56] References Cited
UNITED STATES PATENTS

| 1,593,665 | 7/1926 | Moores ........................ | 214/16.1 A |
| 1,813,460 | 7/1931 | Mugler ......................... | 214/16.1 A |
| 2,715,970 | 8/1955 | Carr ............................. | 214/16.1 A |
| 2,776,522 | 1/1957 | Schramm et al. ............. | 214/16.1 A |
| 3,055,517 | 9/1962 | Kirkland........................ | 214/16.1 A |
| 3,351,218 | 11/1967 | Garthoffner.................. | 214/16.18 D |
| 3,395,815 | 8/1968 | Johnson ....................... | 214/16.1 A |
| 3,498,480 | 3/1970 | Gutridge ...................... | 214/16.1 A |

FOREIGN PATENTS

| 1,211,622 | 10/1959 | France ......................... | |
| 1,400,390 | 4/1965 | France ......................... | |
| 202,597 | 8/1923 | Great Britain................ | |
| 992,238 | 5/1965 | Great Britain................ | |
| 644,705 | 9/1962 | Italy ............................. | |

Primary Examiner—Gerald M. Forlenza
Assistant Examiner—Raymond B. Johnson
Attorney—Karl W. Flocks ABSTRACT: A substantially skeletonized, welded vehicle storage system in which vertical columns support above an underlying storage area parking bay means comprising storage bays produced from parallel channel-shaped trackways in which the trackways extend radially from an elevated turntable and comprise first and second generally parallel sets of trackways for accommodating different length vehicles, i.e., "-compacts" and "conventional" lengths, and in which an inclined ramp is provided to direct vehicles to a conveyor ramp on the turntable whereby vehicles can be readily transferred to and from the storage bays: and further in which the conveyor ramp may include lift means and a plurality of storage decks, substantially duplicating the lower storage bays, and which are accessible to the conveyor ramp as it is elevated; and in which the conveyor ramp is tiltable about its pivot axis whereby the center of gravity shifts to appraise one as to when a vehicle is substantially centered thereon; and in which a generally closed path of bearings are provided for engagement beneath the conveyor ramp, and the bearings generally comprise wheel elements disposed on an axis of rotation extending radially from the vertical axis of rotation of the conveyor ramp of the turntable.

INVENTOR
LEWIS MULITZ
BY
KARL W. FLOCKS
ATTORNEY

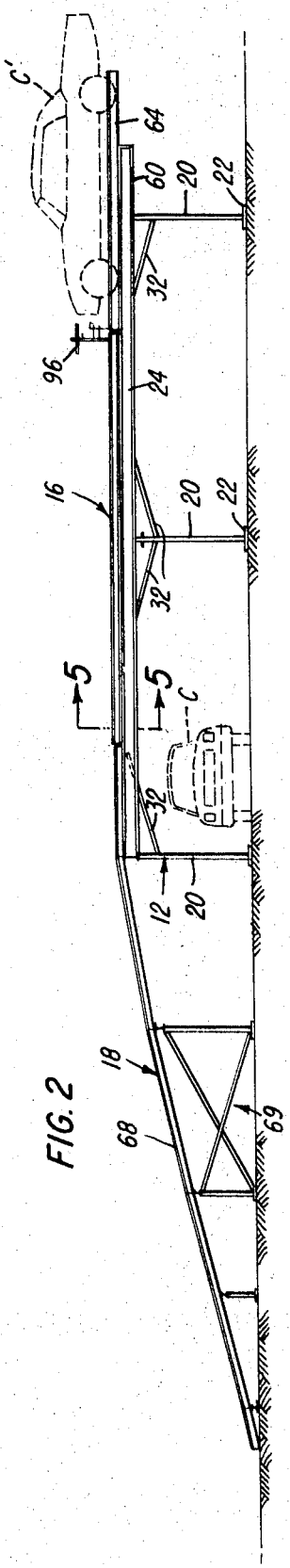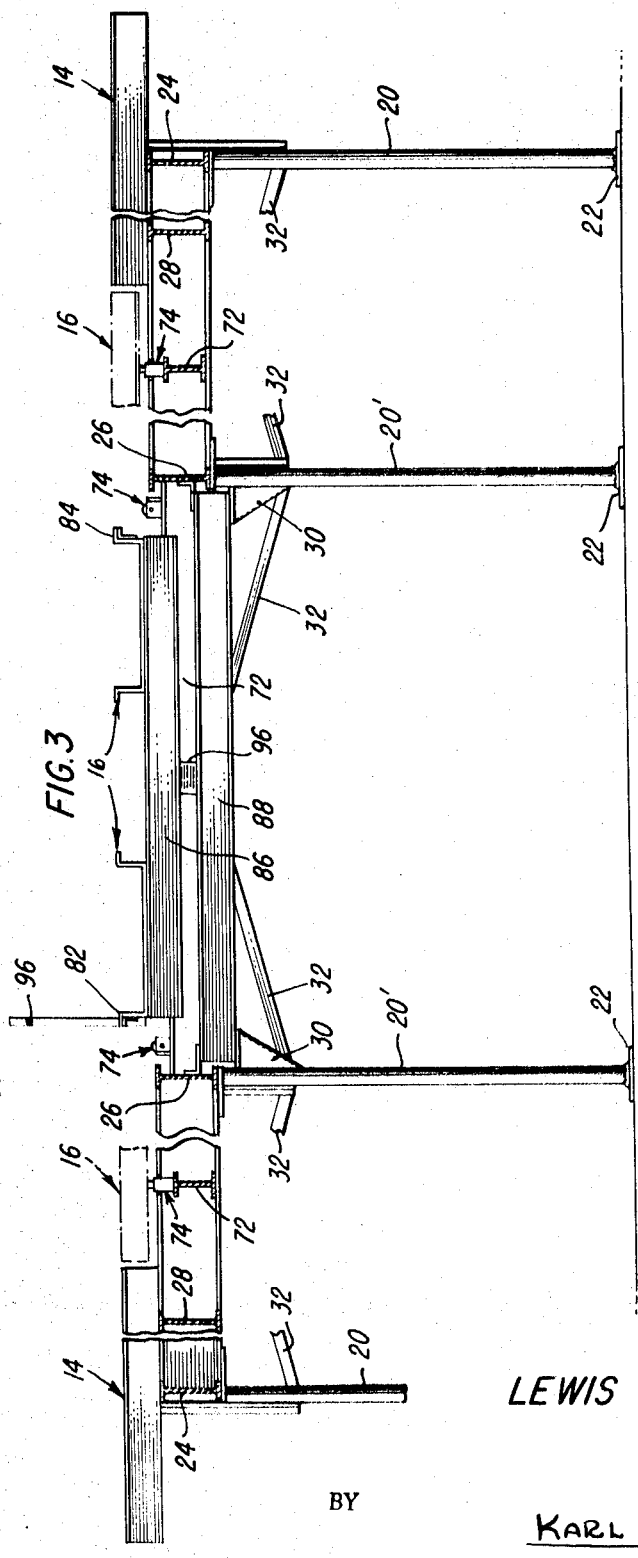

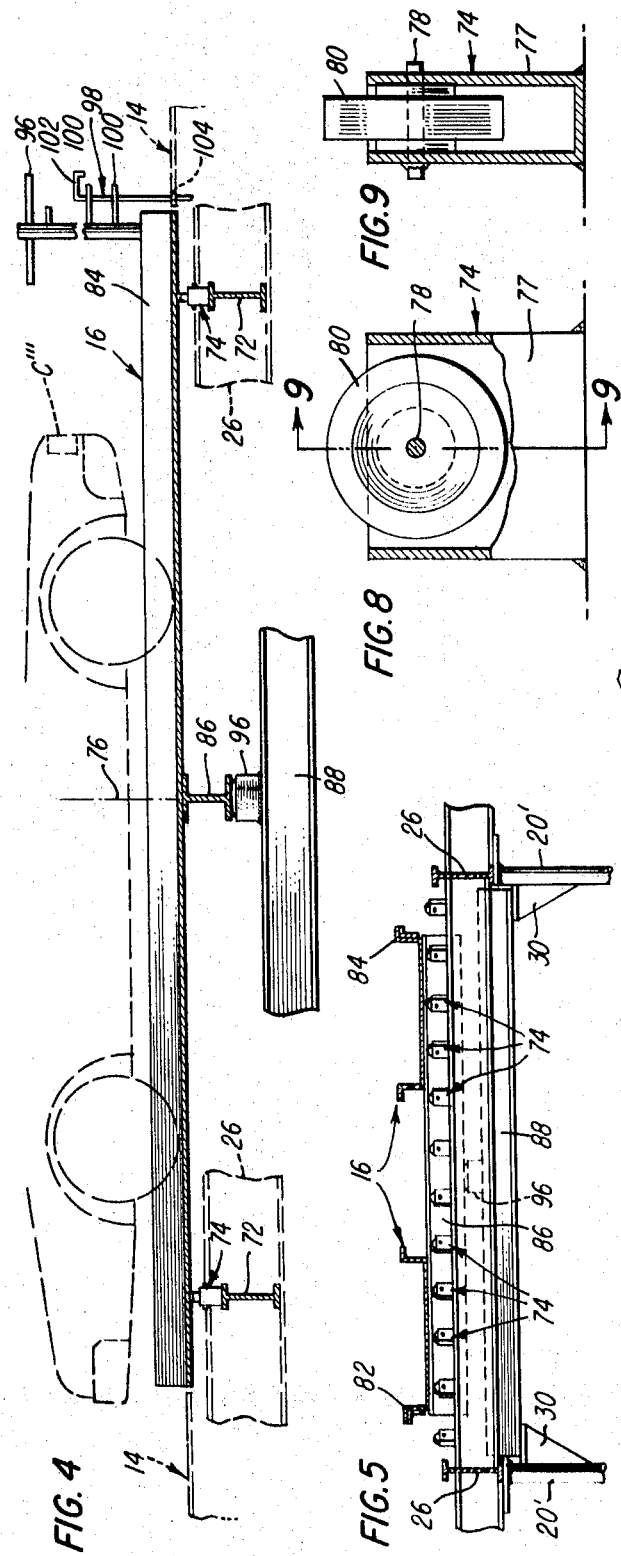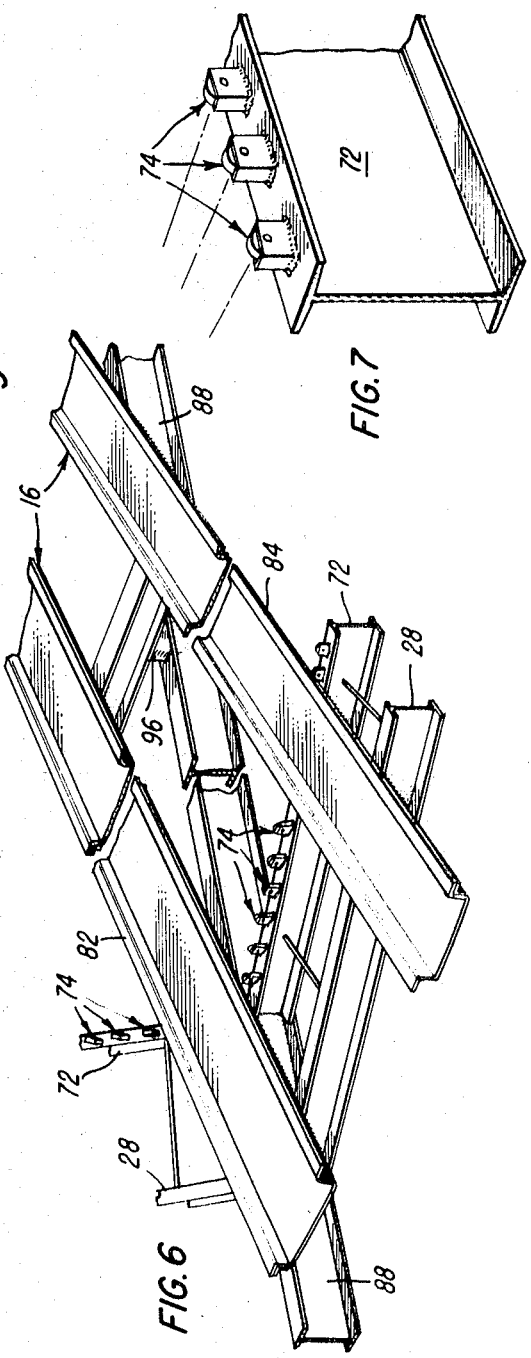

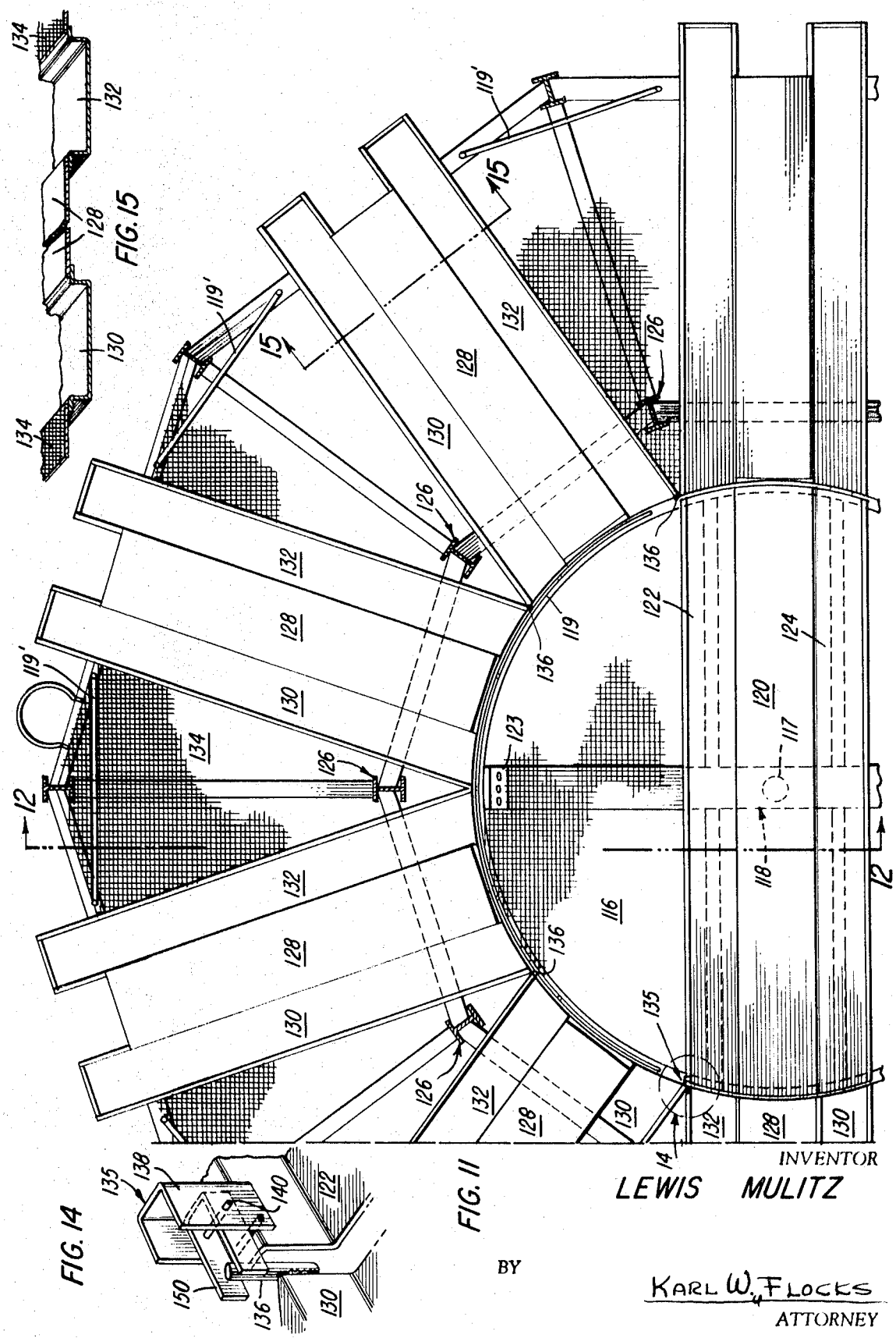

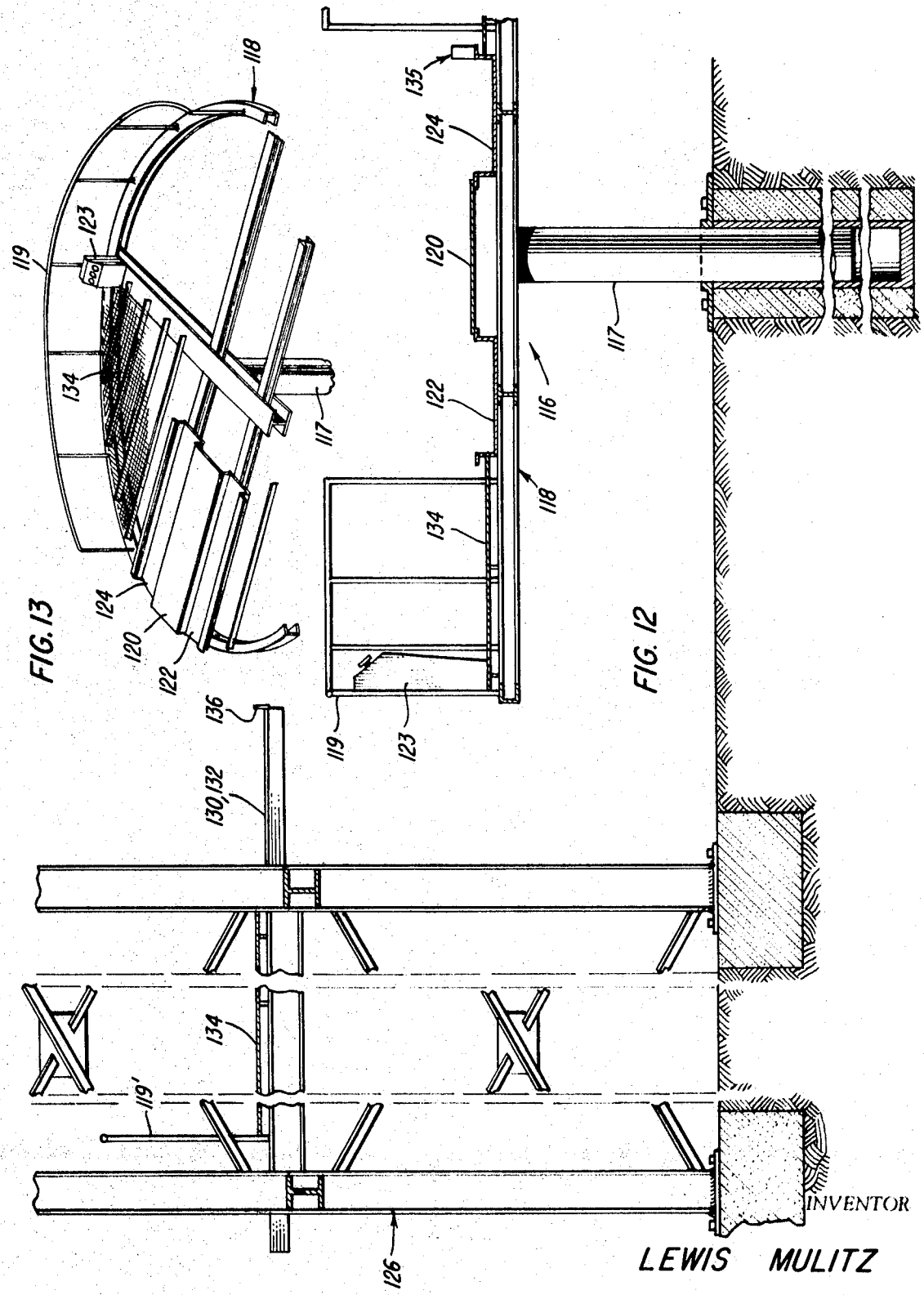

VEHICLE PARKING EQUIPMENT

BACKGROUND OF THE INVENTION

1. Field of the Invention

This invention relates to the problem of the increasing number of motor vehicles and the ever-growing scarcity of facilities for parking the same, particularly in urban areas, where space is at a premium.

Many attempts have been made to solve this critical problem, as illustrated for example by the U. S. Pats. to Kirkland No. 3,055,517; U. S. Pat. to Johnson No. 3,395,815 or U. S. Pat. to Fournier No. 1,925,442.

2. Summary of the Invention

This invention relates to an improved parking system which, contrary to the prior art, is a relatively inexpensive and preferably welded structure; which is substantially skeletonized and in the main is constructed from conventional steel structural shapes. Primarily, the invention is directed to a system in which a plurality of vertically extending columns support thereon an elevated parking area and define therebeneath a parking area so maximum utilization of available space can be achieved. The vertically elevated parking area comprises a plurality of parking or storage bays which preferably comprise a plurality of first and second trackways designed and arranged to accommodate both "conventional" and "compact" vehicles. The storage bays or trackways are communicable with a turntable comprising a conveyor trackway or ramp which is rotatable about a vertical axis of rotation and which is tiltable horizontally thereabout so that a shift at the center of gravity will appraise one when a vehicle is properly centered; the conveyor ramp being engagable as it progressively rotates, with a plurality of bearings generally disposed in a pattern and surrounding the axis of rotation of the conveyor ramp; The structure including an inclined communicating ramp as means by which vehicles can be transferred onto or off the turntable or conveyor ramp; and the structure being of such a character as to lend itself to having a plurality of vertically spaced levels or decks conforming in shape and general construction to that of the parking area, and communicating with the conveyor ramp which may be oriented and elevated by means of a suitable lift.

These, together with other and more specific objects and advantages, will become apparent from a consideration of the following description when taken in conjunction with the drawing forming a part hereof, in which:

In the Drawing

FIG. 2 is a side elevational view taken substantially on the plane of line 2—2 of FIG. 1;

FIG. 3 is an enlarged vertical section taken on the plane of line 3—3 of FIG. 1 with portions broken away;

FIG. 4 is an enlarged vertical section taken on the plane of line 4—4 of FIG. 1;

FIG. 5 is a fragmentary section taken substantially on the plane of line 5—5 of FIG. 2;

FIG. 6 is an enlarged fragmentary perspective view illustrating details of the rotary conveyor ramp;

FIG. 7 is a fragmentary, diagrammatic perspective view illustrating the axis of rotation of the respective bearing wheels for the rotary conveyor ramp;

FIG. 8 is an enlarged side elevational view of one of the bearing wheels of the rotary conveyor ramp, a portion of the housing being broken away;

FIG. 9 is a section taken on the plane of line 9—9 of FIG. 8;

FIG. 11 is a top plan view, portions broken away and sectional, of a multideck parking apparatus of an alternate embodiment;

FIG. 12 is a section, portions broken away, and taken substantially on the plane of line 12—12 of FIG. 11;

FIG. 13 is a fragmentary perspective view of the elevatable rotary-conveyor ramp of FIGS. 11 and 12;

FIG. 14 is an enlarged fragmentary perspective view, taken substantially at the area identified by reference numeral 14 in FIG. 11, and generally illustrating an orienting latch for aligning the conveyor ramp with a parking bay; and FIG. 15 is an enlarged vertical section taken substantially on the plane of line 15—15 of FIG. 11.

DESCRIPTION OF THE PREFERRED EMBODIMENT

Figure 1:
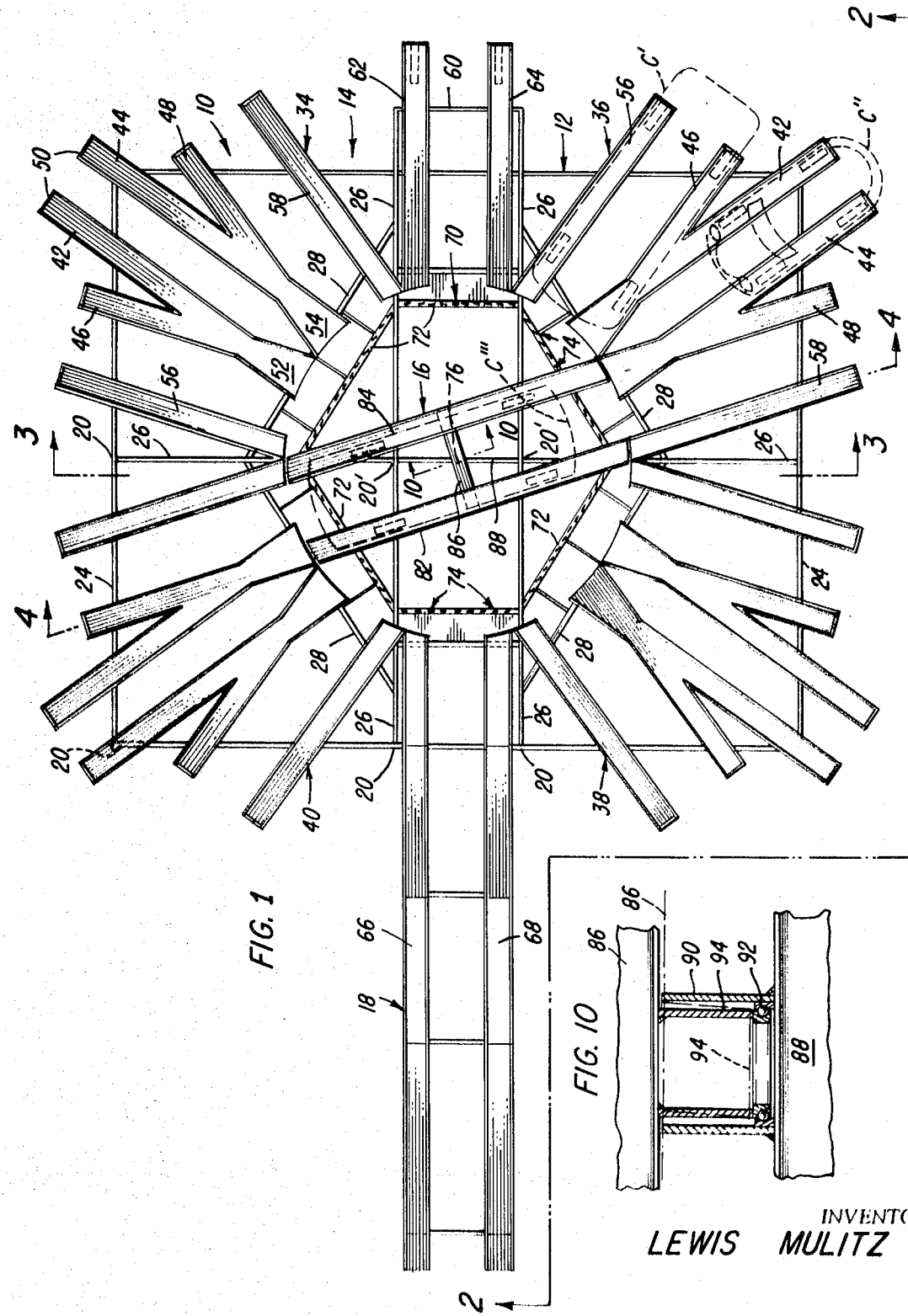
FIG. 1 is a top plan view of apparatus of the parking system, showing in phantom lines two different-length vehicles in parking bays, and a third vehicle on the rotary conveyor ramp.

Referring to the drawings in detail, and first considering FIGS. 1 through 3, the apparatus of the system is indicated generally at 10 and comprises a support frame indicated generally at 12, parking bay means indicated generally at 14, turntable means indicated generally at 16, and access ramp means indicated at 18. The apparatus will be produced from generally conventional structural steel forms and plates, and preferably, but not necessarily, anchored to ground or support surface; on the other hand, the assembly or apparatus is of such a weight that supplemental anchoring or extensive preparation of a foundation will apparently be unnecessary. In other words, minimal ground preparation is required, and the apparatus although of a relatively substantial character and weight, can be dismantled by cutting and readily transported from one location to another.

The support frame 12 is substantially skeletonized and is so dimensioned and arranged to accommodate a plurality of cars C parked at ground level, i.e., in addition to elevated parking, as will become apparent, ground level parking will continue to be available and practical according to the present system. The support frame 12 comprises a plurality of vertically extending columns 20 having welded thereto horizontal feet or base plate elements 22 and preferably arranged in a rectangular pattern as seen in FIG. 1. Suitably welded and secured to the upper ends of the columns 20, i.e., those disposed in a rectangular pattern, is an outer frame 24 preferably assembled from I-beams; see FIG. 3. The columns 20', i.e., those installed in spaced relation on a transverse medial plane bisecting the frame 24, and suitable support beams 26 are welded to the frame 24, columns 20' forming an inner polygonal frame 28; also produced from I-beams. Suitable gusset plates 30 or the like, as well as brace elements 32, will be installed where necessary.

The parking bay means 14 comprises a plurality of channellike welded elements defining parking bays 34, 36, 38 and 40 disposed in quadrants of a circular arrangement in sectors of the rectangular frame 24; see FIG. 1. Each of the parking bays 34—40 comprise channel elements which have an inverted, hat-shaped cross section (to retain and guide the wheels of a vehicle being parked) and as is observed in FIG. 1, these elements or trackways are disposed in "simple-beam" relationship, i.e., extending transversely between or over the outer frame 24 and inner frame 28; and are supported at both ends.

The parking bays 34—40 generally comprise a first pair of mutually parallel ramps or trackways 42 and 44 intermediately communicating with angularly diverging segmental trackways 46 and 48, respectively. The outer ends of the trackways 42—48 will have suitably secured therein transverse abutment plates or stops 50. The inner ends of the trackways 42 and 44 diverge as seen at 52 and 54, respectively, for readily accommodating vehicles to be parked and facilitating the parking of two different length vehicles. Disposed outwardly at the trackways 46 and 48 and in the "simple-beam" relationship previously mentioned, are supplemental trackways 56 and 58 which are generally parallel to the diverging trackways 46 and 48, respectively. As is apparent from the cars indicated at C' and C" the latter is a "compact" or shorter length car, which will be stored outwardly or near the terminal ends of the trackways 42 and 44. Even though car C" is parked, the adjacent trackways 48, 58 or 46, 56 will readily accommodate a "conventional" length car C'.

In order to utilize all available parking space, extending diametrically from the access ramp means 18 is a supplemental support frame 60 which has extending thereon mutually parallel trackways 62 and 64 defining a supplemental parking bay.

The ramp means 18 comprises a pair of mutually parallel trackways 66 and 68 conveniently inclined at about 15° and suitably reinforced by columns and bracing elements indicated generally at 69. Although not described in detail, the various trackways of the access ramp 18, supplemental parking bay comprising trackways 62, 64, and the trackways comprising the parking bays 34–42 will all have on their upper surfaces friction-increasing material, and may even comprise an expanded grill work to obviate the accumulation of ice and snow as well as debris on the trackways, facilitating cleaning and maintenance, as well as reducing the total weight of steel used.

Suitably supported on the support frame and conveniently assuming a hexagonal pattern is bearing means indicated generally at 70, and comprising a plurality of suitably welded I-beams 72 which have extending vertically therefrom a plurality of individual bearing assemblies 74. The turntable means 16 conveniently includes a central vertical axis of rotation 76 and each of the bearing assemblies 74 comprise a substantially rectangular housing 77 having a transverse shaft 78 in radial alignment with the vertical pivot axis of the turntable means 16 and including bearing wheels or roller elements 80 journaled for free rotation on the shaft 78 and engageable with the undersurface of the turntable means 16 as it traverses its path of rotation about the vertical axis 76.

The turntable means 16 comprises a pair of mutually parallel trackways 82 and 84 integrally connected to each other by suitable bracing elements and including a medial or central element 86 defining the tilting axis as well as the portion journaling the turntable means for rotation in a horizontal plane about the vertical axis 76. For convenience, the trackways 82 and 84 and the structure integrally connecting them together is conveniently described as a conveyor-ramp, and it is this structure which facilitates locating of various vehicles such as that indicated C''', in the various pairs of cooperating mutually parallel trackways previously described. The outer ends of the trackways 82 and 84 are suitably cut to define a circular path of rotation and the inner ends of the trackways 42, 44, 46, 56, 48, 58, 62, 64, 66 and 68, are correspondingly cut.

A central pivot bearing is mounted in vertically extending relation on a transverse support beam 88 and includes cylindrical housing 90 having located in its lower end a bearing race; preferably ball bearings 92.

Figure 10:
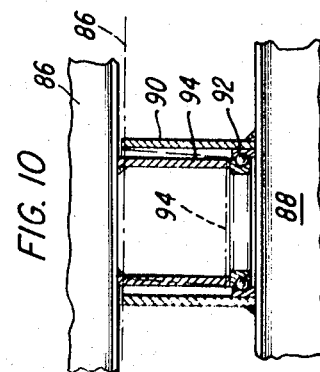
FIG. 10 is an enlarged fragmentary vertical section taken substantially on the plane of line 10—10 of FIG. 1, and illustrating by means of phantom lines the manner in which the rotary-conveyor ramp tilts during shifting of its center of gravity.

The transverse member 86 of the conveyor ramp includes a depending, cylindrical stub shaft 94 which is loosely received within the housing 90 and which is of sufficient height to permit tilting of the conveyor ramp in the manner indicated by the phantom lines of FIG. 10.

This lost motion bearing connection or tilting conveniently appraises one as to when the car C''' is substantially centered on the conveyor ramp. For example, as a vehicle is driven up the access ramp 18 and enters onto the trackways 82 and 84, the conveyor ramp; see FIG. 4, tilts to the left until the front end of the car C''' shifts to the center of gravity of the conveyor ramp to the right, and at this time the ramp will tilt to the right and the front end of the vehicle C''' will move downwardly; the car is centered on the conveyor ramp so turning effort is minimized.

When a driver moves a car onto the conveyor ramp and the conveyor ramp tilts forwardly he is immediately appraised that the vehicle is centered and the center of gravity is such that the conveyor ramp will have its greatest freedom of rotation. The operator of the system can then apply pressure to one or the other side of the vehicle and can readily manually pivot the conveyor ramp about the pivot axis 76. To facilitate moving the car manually, a vertically extending, suitably secured T-shaped handle 96 is provided on one of the trackways, i.e. 84, of the conveyor ramp, and projecting laterally from the handle 96 is a releasable, orienting-lock assembly 98. The orienting-lock assembly 98 comprises a pair of support plates 100 reciprocably supporting a manually withdrawable L-shaped pin 102, the lower end of which is engageable in a suitable aperture 104 on one of the trackways of the respective parking bays.

When the pin 102 is engaged in an aperture 104, this indicates that the trackways 82 and 84 of the conveyor ramp means are in alignment with trackways of a respective parking bay and then a parking procedure can be accomplished. The present system contemplates manual rotation of the conveyor ramp and driving of the vehicle into the respective parking bays after the vehicle has negotiated the access ramp 18 and is oriented onto the conveyor ramp 16.

Referring to FIGS. 11–15, the foregoing apparatus lends itself to multideck parking bay installations and additional mechanization. Considering FIG. 12, for example, a fluid-pressure operated lift is indicated generally at 116 and is comparable to the conveyor ramp or turntable means 16 of the previously described embodiment. The fluid-pressure operated lift 116 includes a central piston element 117 which is extensible to project a platform portion 118 to various levels of parking. The lift 116 is of a generally circular configuration having a suitable guard rail 119 as well as a control console 122 which will incorporate manually operated controls (of a conventional character) which will cause power-operated rotation of the support platform 18 as well as power-operated lifting of this platform. The platform 118 has diametrically disposed thereon a trackway 120 including parallel tracks 122 and 124. Extending vertically in peripheral and surrounding relationship to the lift 116 is a support structure indicated generally at 126 and defining a plurality of parking bays or parking decks 128, etc. Each of the parking decks incorporates a plurality of radially extending, mutually parallel trackways 130, 132 defining a parking bay for either a conventional length or "compact" vehicle. Areas between the respective tracks 130, 132 will have suitably secured relatively high strength screening 134 to prevent injury to operators of the system and to permit their walking between the respective parking bays.

As indicated at 14 on FIG. 11, and as illustrated in FIG. 14, an alternate-type releasable-latch means for orienting the trackways 122 and 124 to the respective parking bays comprising trackways 130 and 132 is illustrated generally at 135. This releasable-latch means 135 comprises a vertically extending pin 136 suitably welded adjacent the inner end of the respective trackways 130, for example. Mounted at the outer end of the trackway 122 is vertically extending U-shaped channel 138 having a transverse pivot shaft 140; upon which is pivotally mounted a U-shaped latch or coupler element 150 having bifurcations which will embracingly engage opposite sides of the pin 136 and orient trackways 122, 124 with trackways 130 and 132, respectively, of the parking bays.

I claim:
1. A vehicle storage system comprising:
   a vertical support frame defining a plurality of ground-level accessible, laterally opening parking areas, an elevated storage area on said support frame and overlying said parking area,
   said storage area comprising a plurality of radially disposed parking bays for respectively accommodating at least one vehicle therein including
      a first pair of substantially parallel trackways for accommodating vehicle wheels thereon,
      each trackway of said first pair communicating intermediately with an angularly diverging trackway,
      a linear trackway extending generally parallel to said diverging trackway and defining therewith a second pair of trackways,
      said first and second pairs of trackways simultaneously accommodating two different length vehicles thereon,
   turntable means journaled on a vertical axis of rotation within the area defined by inner portions of said radially disposed parking bays;

said turntable means comprising a conveyor ramp alignable with a storage bay for communicating a vehicle thereto,
said conveyor ramp including
a pair of medially pivoted, integrally connected trackways,
first cylindrical means mounted on said support frame,
second cylindrical means connected to said trackways of said conveyor ramp and extending into said first cylindrical means,
loose fitting means to tilt said second cylindrical means in relation to said first cylindrical means
whereby a vehicle loaded onto said conveyor ramp shifts the center of gravity of said conveyor ramp to apprise one that a vehicle is substantially centered on said conveyor ramp; and
an elevating ramp extending angularly between the ground surface to the area traversed by said conveyor ramp and communicating therewith for transferring vehicles to and from the storage bays.

2. The structure as claimed in claim 1 including a plurality of bearings disposed in a pattern surrounding the axis of rotation of said conveyor ramp, said bearings being successively engageable beneath said conveyor ramp as it is rotated.

3. The structure as claimed in claim 2 in which said bearings comprise wheel elements disposed on an axis of rotation extending radially from the axis of rotation of said conveyor ramp.

4. The structure as claimed in claim 1 in which said conveyor ramp includes aligning-lock means releasably engageable with respective storage bays for maintaining the conveyor ramp in oriented relation with a storage bay when loading or unloading a vehicle.